US012359639B1

(12) United States Patent
Juchems et al.

(10) Patent No.: US 12,359,639 B1
(45) Date of Patent: Jul. 15, 2025

(54) POWER DRAW CONTROL FOR FUEL INJECTORS

(71) Applicant: Caterpillar Inc., Peoria, IL (US)

(72) Inventors: Mitchell B. Juchems, Eureka, IL (US); Seth Evans, Normal, IL (US); Daniel R. Puckett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/608,195

(22) Filed: Mar. 18, 2024

(51) Int. Cl.
*F02D 41/20* (2006.01)

(52) U.S. Cl.
CPC ........ *F02D 41/20* (2013.01); *F02D 2200/101* (2013.01)

(58) Field of Classification Search
CPC ........................... F02D 41/20; F02D 2200/101
See application file for complete search history.

(56) References Cited

U.S. PATENT DOCUMENTS

| | | | | |
|---|---|---|---|---|
| 6,571,773 | B1 * | 6/2003 | Yamakado | F02D 41/20 361/152 |
| 10,941,738 | B1 * | 3/2021 | Puckett | F02D 41/38 |
| 11,098,670 | B2 * | 8/2021 | Kusakabe | F02D 41/3836 |
| 11,795,886 | B2 * | 10/2023 | Marrack | F02D 41/20 |
| 11,795,887 | B1 * | 10/2023 | Juchems | F02D 41/20 |
| 2021/0140386 | A1 * | 5/2021 | Puckett | F02M 63/0015 |
| 2023/0184189 | A1 * | 6/2023 | Marrack | F02D 41/402 123/490 |
| 2023/0193844 | A1 * | 6/2023 | Juchems | F02D 41/20 123/446 |
| 2024/0044299 | A1 * | 2/2024 | Marrack | F02D 41/401 |
| 2025/0020095 | A1 * | 1/2025 | Juchems | F02M 65/005 |

FOREIGN PATENT DOCUMENTS

| | | |
|---|---|---|
| CN | 112302822 A | 2/2021 |
| JP | 2004270594 A | 9/2004 |

* cited by examiner

*Primary Examiner* — Phutthiwat Wongwian
*Assistant Examiner* — Susan E Scharpf
(74) *Attorney, Agent, or Firm* — Bookoff McAndrews, PLLC

(57) ABSTRACT

In one instance, disclosed herein is a method for controlling a fuel injector of an engine system, the method comprising: determining, based on an engine condition of the engine system, a pull-in duration for the fuel injector during which current is applied to move a valve member away from a resting position; applying a current to a valve solenoid to move the valve member of the fuel injector to a closed position for the determined pull-in duration; and after the determined pull-in duration, reducing the current applied to the valve solenoid to a keep-in level.

20 Claims, 7 Drawing Sheets

POWER DRAW CONTROL FOR FUEL INJECTORS

TECHNICAL FIELD

The present disclosure relates generally to internal combustion engines, and more particularly, to methods and systems for controlling the power draw of a fuel injector.

BACKGROUND

An internal combustion engine often includes an electronic controller that governs and/or monitors various aspects of the operation of the internal combustion engine. For example, in order to accurately control the timing and/or quantity of fuel injected into the internal combustion engine by a fuel injector included in the internal combustion engine, internal combustion engine systems include a controller that governs and/or monitors the position of one or more electronically-controlled valves (e.g., solenoid valves) housed within the fuel injector. For efficiency, safety, or regulatory purposes, it is desirable to control or reduce the power drawn by the fuel injector on one or more power sources that provide electrical energy to the one or more electronically-controlled valves. For example, if the power drawn by a fuel injector is not appropriately controlled or reduced, closely-timed injections from the fuel injector may cause a power source that provides electrical energy to the one or more electronically-controlled solenoids of the fuel injector to exceed its power limit.

A method for controlling a fuel injector that includes monitoring currents and/or voltages applied to a valve of the fuel injector is disclosed in U.S. Pat. No. 6,571,773 (the '773 patent) to Yamakado et al. The controller described in the '773 patent monitors voltage provided to the fuel injector to maintain linearity of injection volume. However, the '773 patent does not disclose a method or system for mapping or controlling the power draw of a fuel injector.

The methods and systems of the present disclosure may solve one or more of the problems set forth above and/or other problems in the art. The scope of the protection provided by the present disclosure, however, is defined by the attached claims, and not by the ability to solve any specific problem.

SUMMARY

In one aspect, a method for controlling a fuel injector of an engine system includes: determining, based on an engine condition of the engine system, a pull-in duration for the fuel injector during which current is applied to move a valve member away from a resting position; applying a current to a valve solenoid to move the valve member of the fuel injector to a closed position for the determined pull-in duration; and after the determined pull-in duration, reducing the current applied to the valve solenoid to a keep-in level.

In another aspect, a method for controlling a fuel injector of an engine system includes: for an injection event: applying current to a valve solenoid to move a valve of the fuel injector to an actuated position for a pull-in duration based on a pull-in duration map generated for the fuel injector; and measuring a valve arrival time associated with the valve of the fuel injector; and in a subsequent injection event: applying current to the valve solenoid to move the valve of the fuel injector for a second pull-in duration based on the pull-in map generated for the fuel injector, a start of the current for the second pull-in duration being adjusted based on the measured valve arrival time; and after the second pull-in duration, reducing the current applied to the valve solenoid to a keep-in level.

In another aspect, an engine system may include at least one fuel injector and a controller operative to: determine, based on an engine condition of the engine system, a pull-in duration for the fuel injector; apply a current to a valve solenoid to move a valve of the fuel injector to an actuated position for the determined pull-in duration; and after the determined pull-in duration, reduce the current applied to the valve solenoid to a keep-in level.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of 10% in the stated value. In this disclosure, the term "based on," or any other variation thereof, is intended to cover, for example, "partially based on", "at least partially based on", and "based entirely on."

Figure 1:
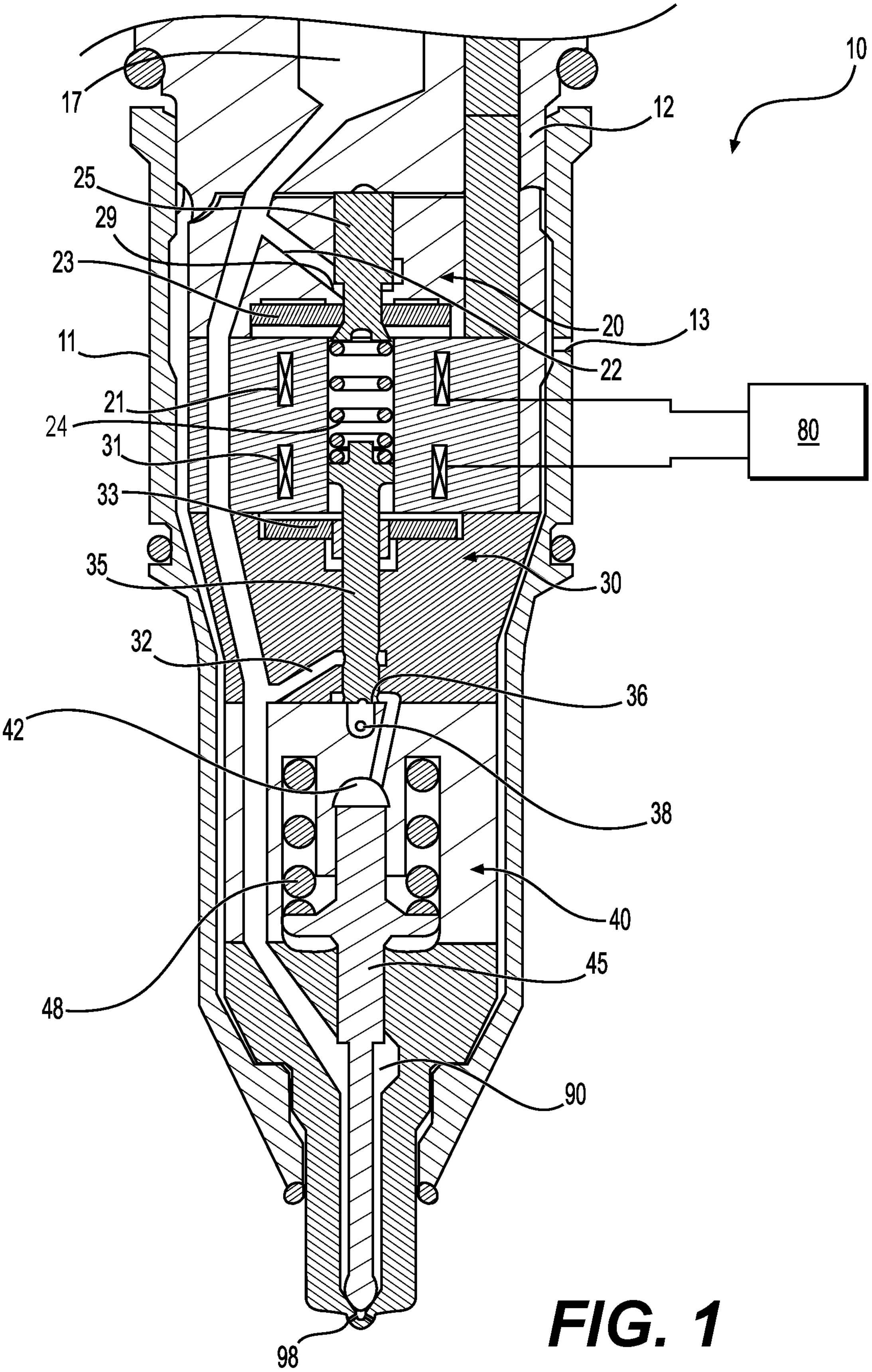
FIG. 1 depicts a schematic, cross-sectional view of a fuel injector.

FIG. 1 illustrates a schematic, cross-sectional view of a fuel injector 12. Fuel injector 12 may be a component of a fuel injection system 10, which may further include one or more power sources (e.g., one or more batteries, or one or more high-voltage power systems; not shown) and one or more controllers (e.g., electronic control module or ECM 80). Fuel injection system 10 may be a component of an engine system (e.g., an internal combustion engine or ICE). The one or more controllers 80 of fuel injection system 10 may be operative to cause the one or more power sources to provide electrical energy to one or more components of fuel injector 12, such as one or more solenoid valves. The components of fuel injector 12 may be operative to cause fuel injector 12 to inject fuel into another component of an engine system in which fuel injector 12 is connected, such as a combustion chamber (not shown).

Fuel injector 12 may be a mechanically-actuated, electronically-controlled fuel injector in which fuel is pressurized by a cam (not shown) and injected based on signals generated with ECM 80. As illustrated in FIG. 1, fuel injector 12 may include an injector body 11. Injector body 11 may house various components of fuel injector 12, such as a fuel reservoir 17, one or more valves (e.g., electronically-controlled solenoid valves) such as a spill valve 20 and a control valve 30, and a series of passages for supplying, returning, and injecting fuel. Fuel reservoir 17 may receive fuel from a fuel source (not shown) which may be pressurized, such as by a cam-actuated piston (not shown), to provide pressurized fuel to a check valve 40. The operation of check valve 40 may be governed by spill valve 20 and control valve 30.

Spill valve 20 may be a normally-open valve that includes a spill valve solenoid 21, a spill valve armature 23, a spill valve member 25, and a spill valve seat 29. When spill valve 20 is at rest (e.g., when spill valve 20 is not actuated by electrical energy), spill valve 20 is in an open or non-injection position, as illustrated in FIG. 1. In the open or non-injection position, spill valve member 25 may be positioned away from spill valve seat 29, permitting communication between a spill passage 22 and a fuel return passage 13. In such a configuration, fuel is allowed to drain from fuel injector 12, thereby reducing the pressure within fuel injector 12 (e.g., the pressure within fuel reservoir 17). Spill valve 20 may be biased toward the open or non-injection position by a spring 24.

When spill valve 20 is fully actuated (e.g., by electrical energy), spill valve 20 is in a closed position. In the closed position, spill valve member 25 may engage with spill valve seat 29, preventing communication between spill passage 22 and fuel return passage 13. In such a configuration, fuel is not allowed to drain from fuel injector 12, causing the pressure within fuel injector 12 (e.g., the pressure within fuel reservoir 17) to increase. In some instances, fuel is not released by fuel injector 12 until spill valve 20 has been actuated into the closed position and the pressure within fuel injector 12 has been increased accordingly. Thus, the actuated or closed position of spill valve 20 may be associated with the injection of fuel.

Control valve 30 may include a control valve solenoid 31, a control valve armature 33, a control valve member 35, and a control valve seat 36. When control valve 30 is at rest (e.g., when control valve 30 is not actuated by electrical energy), control valve 30 is in a non-injection position, as illustrated in FIG. 1. In the non-injection position, control valve member 35 may be positioned so as to permit communication between a control chamber 42 and a high-pressure connection passage 32, as illustrated in FIG. 1. In such a configuration, control valve member 35 may engage with control valve seat 36 and prevent communication between control chamber 42 and a low-pressure connection passage 38, placing control chamber 42 in a pressurized condition that prevents motion of check valve member 45. Control valve 30 may be biased toward the non-injection position by spring 24.

When control valve 30 is fully actuated (e.g., by electrical energy), control valve 30 is in an injection position. In the injection position, control valve member 35 may prevent communication between control chamber 42 and high-pressure connection passage 32, and may permit communication between control chamber 42 and low-pressure connection passage 38, thereby decreasing pressure in control chamber 42. The decreased pressure in control chamber 42 allows check valve member 45 to move, and ultimately allows fuel injector 12 to release fuel.

Check valve 40 may be a one-way valve including a check valve member 45 that, when in a closed check position as illustrated in FIG. 1, prevents communication between a check valve chamber 90 and injection orifices 98. When in an open position, communication may be permitted between check valve chamber 90 and injection orifices 98, allowing fuel to be released. A spring 48 may bias check valve member 45 toward the closed check position. Additionally, check valve member 45 may be held in the closed check position when control chamber 42 is in communication with high-pressure connection passage 32 (e.g., when control valve 30 is in the non-injection position, as described above). Needle valve member 45 may be configured to move from this closed check position to an open check position when control valve 30 is in the actuated or injection position. For example, when spill valve 20 is in the closed position and control valve 30 is in the injection position, control chamber 42 may be at a lower pressure compared to pressure within check valve chamber 90, thereby allowing pressurized fuel in check valve chamber 90 to act against a biasing force of spring 48, lift check valve member 45, and release fuel through orifices 98.

Figure 7:
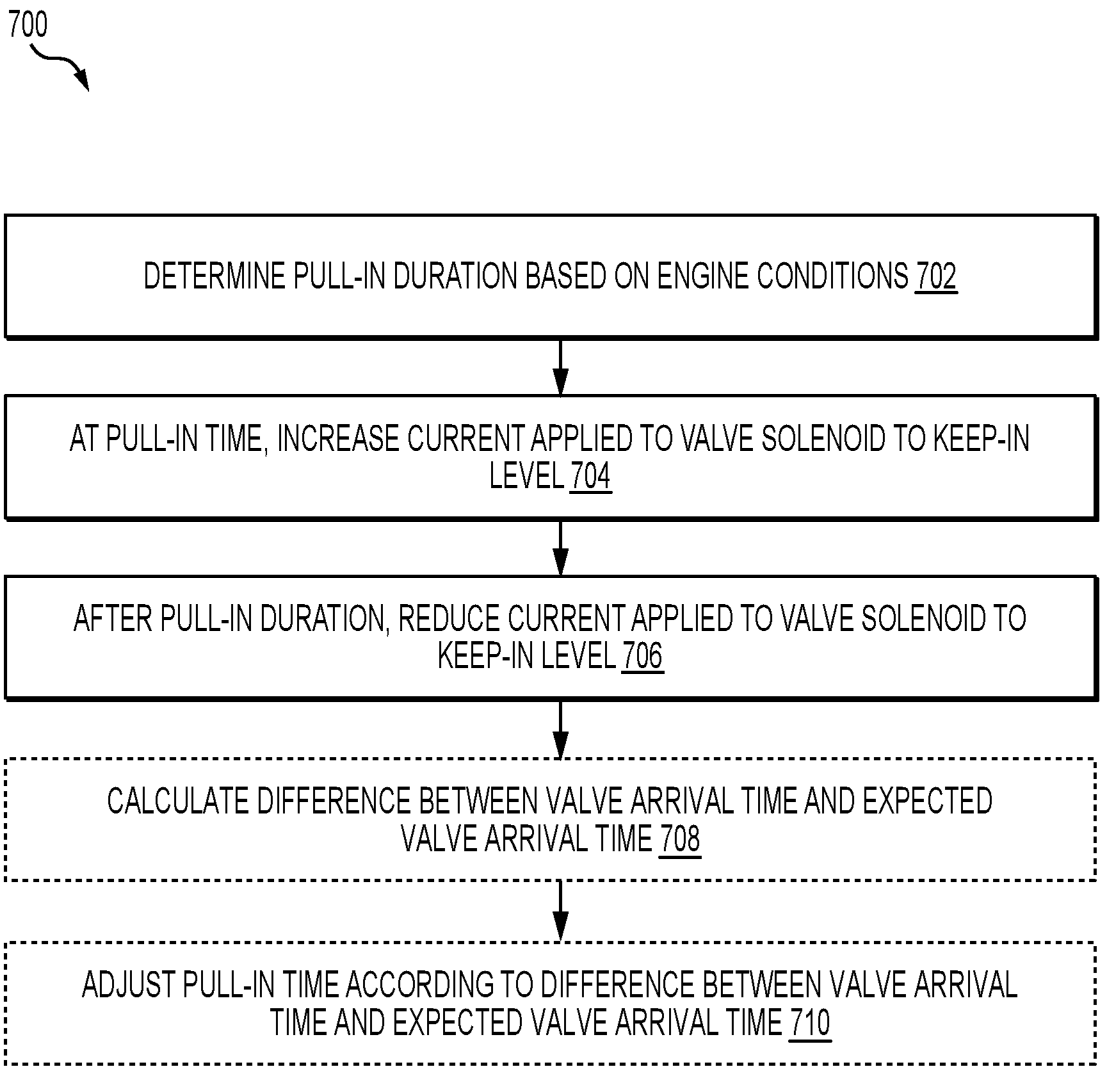
FIG. 7 depicts a flowchart of a method for controlling a fuel injector.

ECM 80 may be configured to receive sensed inputs and generate commands or other signals to monitor or control the operation of a plurality of fuel injectors 12 of fuel injection system 10. ECM 80 may include a single microprocessor or multiple microprocessors that receive inputs and issue control signals, including the application of electrical energy to solenoids 21 and 31. ECM 80 may be configured to control the application of electrical energy, and therefore current, applied to solenoids 21 and 31. For example, ECM 80 may issue commands to selectively energize (e.g., increasing a current applied to) solenoids 21 and 31 with electrical power and may control circuitry configured to de-energize (e.g., reduce a current applied to) solenoids 21 and 31 and/or control a rate of decay of electrical energy stored by solenoids 21 and 31. ECM 80 may include a memory, a secondary storage device, a processor, such as a central processing unit, or any other means for accomplishing a task consistent with the present disclosure. The memory or secondary storage device associated with ECM 80 may store data and software to allow ECM 80 to perform its functions, including the functions described below with respect to method 700 (FIG. 7). In particular, data and software in memory or secondary storage device(s) may allow ECM 80 to perform any of the valve return timing, signal analyses, and adaptive injector control functions described herein. Numerous commercially available microprocessors can be configured to perform the functions of ECM 80. Various other known circuits may be associated with ECM 80, including signal-conditioning circuitry, communication circuitry, and other appropriate circuitry.

Figure 2:
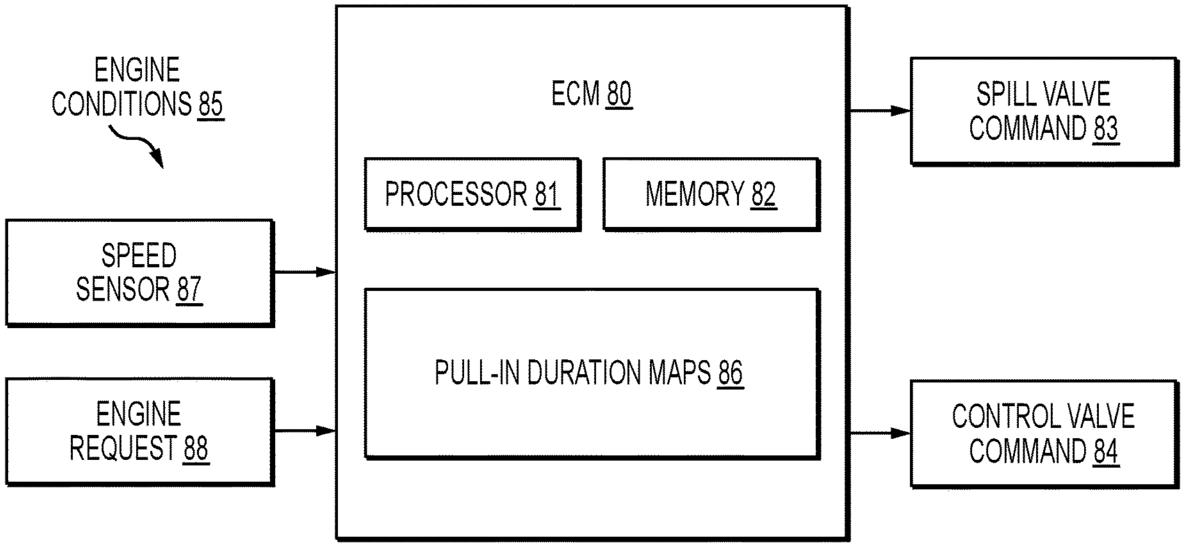
FIG. 2 depicts a block diagram of an exemplary electronic control module used with the fuel injector of FIG. 1.

FIG. 2 depicts a block diagram of an exemplary electronic control module (ECM) 80. As mentioned above, ECM 80 may include a processor 81, a memory 82, or any other means for accomplishing a task consistent with the present disclosure. ECM 80 may be operative to generate and output commands for controlling a fuel injector 12, such as a spill valve command 83 for controlling electrical energy applied to a spill valve 20 (e.g., a spill valve solenoid 21) or a control valve command 84 for controlling electrical energy applied to a control valve 30 (e.g., a control valve solenoid 31). Spill valve command 83 and control valve command 84 may be generated or output by the ECM 80 in the form of signals or waveforms that correspond to instructions for applying or providing electrical energy to spill valve 20 or control valve 30, respectively. ECM 80 may generate and output commands for controlling a fuel injector 12 based on or in response to engine conditions 85. Engine conditions 85 may correspond to one or more signals indicative of engine parameters such as engine speed generated with or sensed by an engine speed sensor 87, requested engine output reflected in an engine request 88 generated with an operator or calculated with ECM 80, or any other input with which ECM 80 may determine various factors associated with the injection of fuel. Engine conditions 85 may include one or more sensed conditions (e.g., engine speed from sensor 87) and one or more conditions calculated by ECM 80 or another control unit (e.g., a desired quantity of fuel injection reflected in engine request 88).

ECM 80 may be operative to generate a spill valve command 83 or a control valve command 84 based at least in part on one or more pull-in duration maps 86. As mentioned above, it may be desirable to control or reduce power drawn by a fuel injector 12 on one or more power sources that supply electrical energy to one or more electronically-controlled solenoids of the fuel injector 12. As described in further detail below, ECM 80 may be operative to control the power drawn by a fuel injector 12 using one or more pull-in duration maps 86. A pull-in duration map 86 may represent a relationship between an amount of power drawn by a fuel injector 12 and an amount of time, which may be referred to as a pull-in duration. A pull-in duration may represent an amount of time that elapses after entering a pull-in current level or tier. This amount of time may begin to be measured at a first time, e.g., when the electrical energy applied to a valve of a fuel injector 12 is first increased to actuate the valve of the fuel injector 12, or once a predetermined threshold electrical energy level (e.g., current level) associated with a pull-in current level is reached. The pull-in current level may be an amount of electrical energy applied to a valve (e.g., a spill valve 20) of a fuel injector 12 to move the valve to an actuated position (e.g., a closed position). The pull-in duration may end at a second time at which the electrical energy applied to the valve of the fuel injector 12 begins to be reduced to a lower, intermediate level that keeps the valve in the actuated position, which may be referred to as a keep-in level.

The amount of time that elapses between the first time (which may be referred to as a pull-in time) and the second time may be referred to as a pull-in duration. In general, a longer pull-in duration results in more power drawn by a fuel injector 12. The power drawn by a fuel injector 12 given a particular pull-in duration may be at least in part determined by one or more engine conditions 85, such as engine speed.

Figure 3:
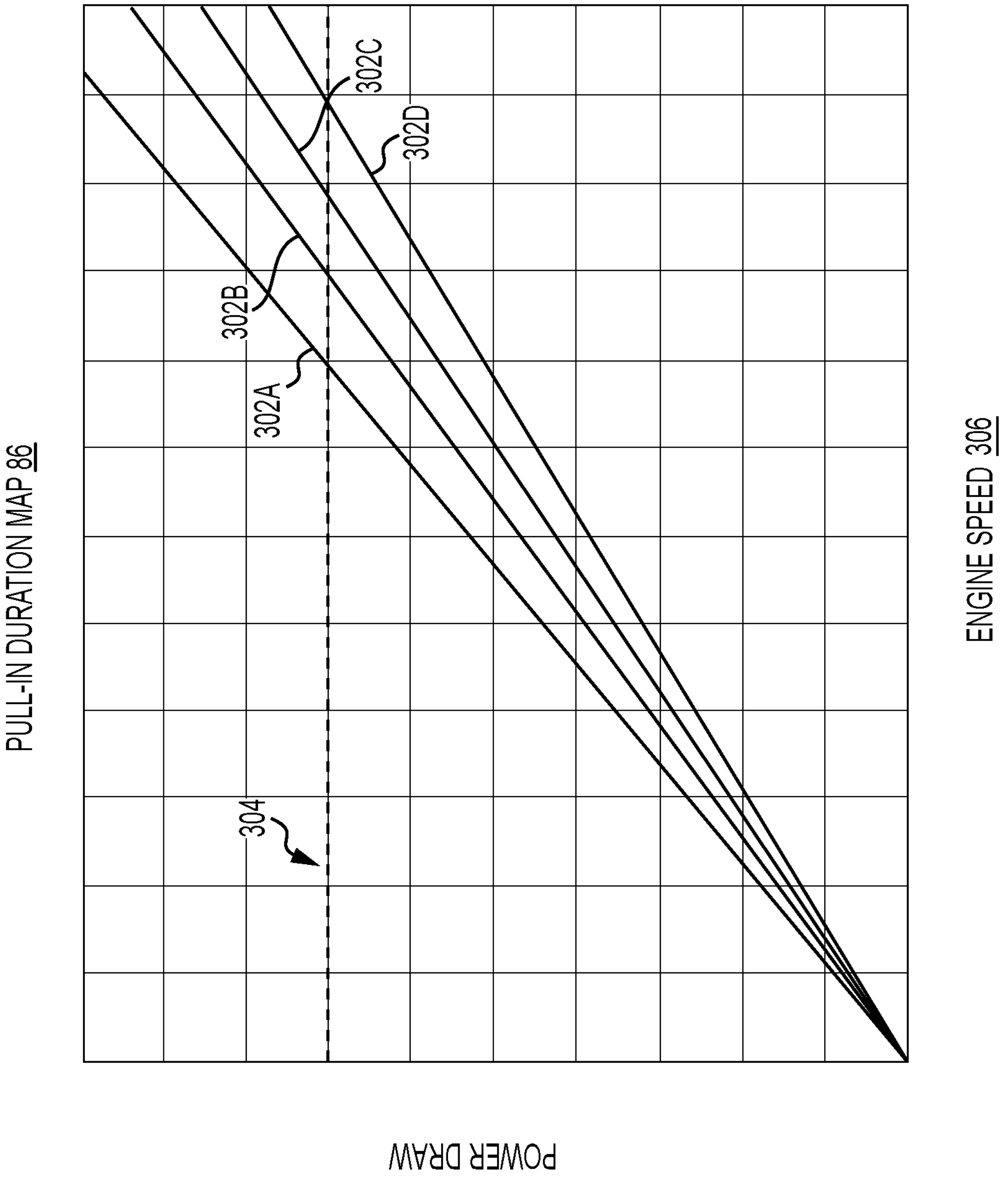
FIG. 3 depicts a chart representing an exemplary pull-in duration map of the electronic control module of FIG. 2.

For example, FIG. 3 depicts an exemplary pull-in duration map 86 generated for a fuel injector 12. In this example, through a series of tests (e.g., end-of-line (EOL) tests) performed on a fuel injector 12 (as described in greater detail below), a relationship between different pull-in durations and the power drawn by a fuel injector 12 on one or more power sources, given a particular engine speed of an engine system in which the fuel injector 12 was included, was determined. While four pull-in durations 302A-302D are shown in FIG. 3, more than four durations or fewer than four durations may be tested. In this example, the lengths of the pull-in durations 302A-302D decrease from left to right (e.g., 302A is the longest pull-in duration, and 302D is the shortest pull-in duration).

As depicted in FIG. 3, for any given engine speed, a shorter pull-in duration results in a lower amount of power drawn by the fuel injector 12. For example, at a first engine speed 306, pull-in duration 302A, which may have the longest length, results in a first power draw; pull-in duration 302B, which may have a shorter length, results in a second power draw that is less than the first power draw; pull-in duration 302C, which may have a third length that is shorter than the first length and the second length, results in a third power draw that is less than the first power draw and the second power draw; and pull-in duration 302D, which may have a fourth length, results in a fourth power draw that is smaller than each of the first, second, and third power draws. As depicted in FIG. 3, the one or more power sources that provide electrical energy to the fuel injector 12 may have a power limit 304.

In some instances, one or more pull-in duration maps 86 may be generated by performing a series of tests (e.g., end-of-line (EOL) tests) on a fuel injector 12. An EOL test may be a quantitative or qualitative control task executed at the end of a production line or at another time after manufacture. For example, before a fuel injector 12 is used in an engine of a machine, a producer of the fuel injector 12 may perform one or more EOL tests on the fuel injector 12 to ensure that the fuel injector 12 can withstand a certain amount (e.g., a commercial grade) of heat, cold, or pressure. Any number of EOL tests may be performed on a fuel injector 12 to test the fuel injector 12 for any number of qualitative or quantitative metrics or factors. However, in some instances, the tests performed on a fuel injector 12 to generate a pull-in duration map 86 for the fuel injector 12 may be performed (e.g., by an ECM 80) during operation of the fuel injector 12 (e.g., at startup, shutdown, or steady-state operation of an engine system that includes the fuel injector 12). If desired, each fuel injector 12 may be tested individually, such that a pull-in duration map 86 is specific to a single fuel injector 12.

Figure 4:
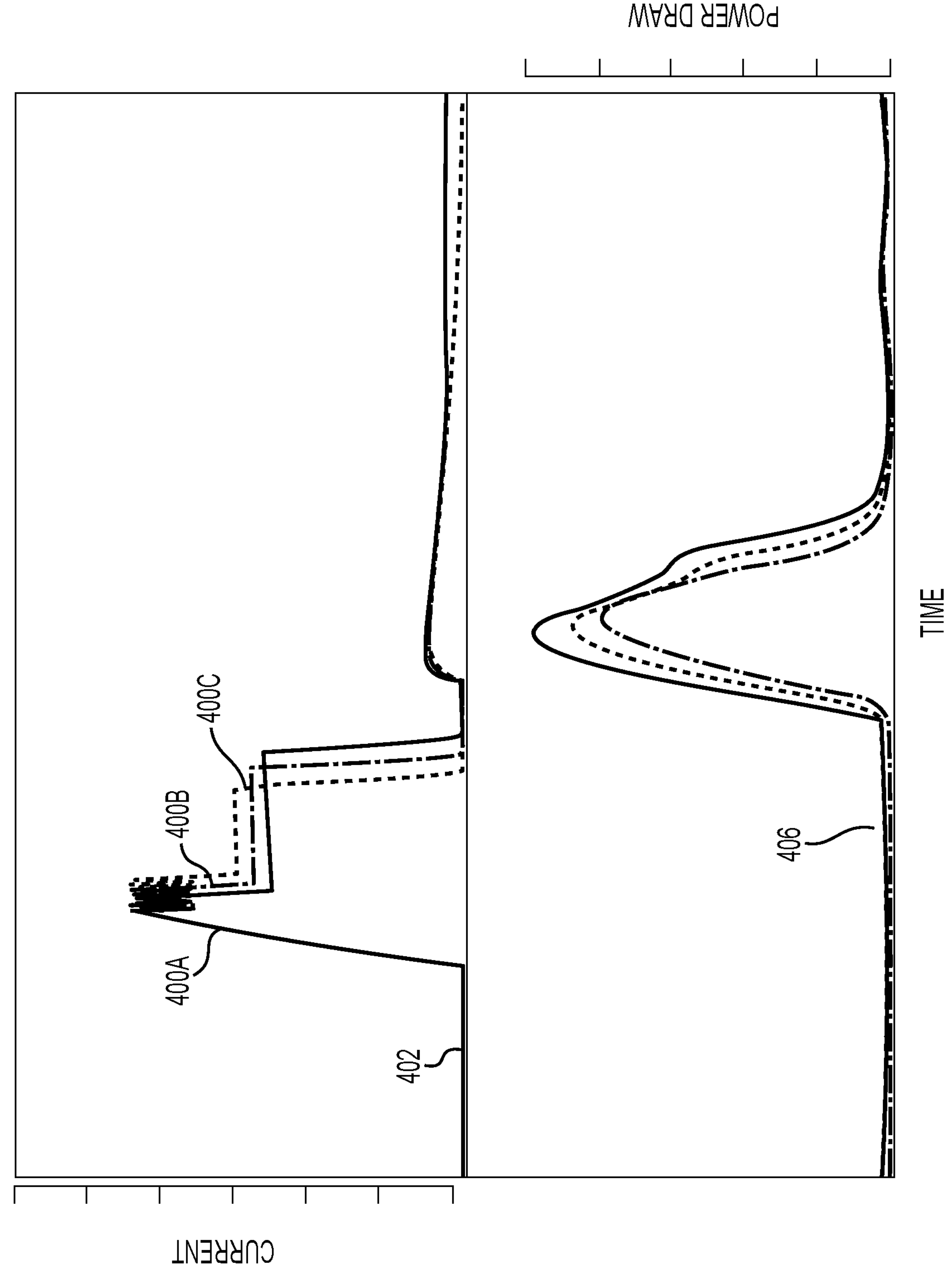
FIG. 4 depicts a chart representing an exemplary series of end-of-line (EOL) tests.

FIG. 4 depicts an exemplary series of tests used to generate a pull-in duration map 86 for a fuel injector 12. Three tests 400A-400C are depicted in FIG. 4. For each of the three tests, the electrical energy 402 applied to a spill valve solenoid 21 of a fuel injector 12 was increased to move a spill valve 20 of the fuel injector 12 to a closed position at the same time. However, in each test, the electrical energy 402 applied to the spill valve solenoid 21 of the fuel injector 12 is reduced to a keep-in level (as described above) to keep the spill valve 20 of the fuel injector 12 in the closed position at a different time, and thus each test has a different pull-in duration (as described above). For example, the electrically energy 402 applied to the spill valve solenoid 21 of the fuel injector 12 is reduced to a keep-in level earlier in test 400A than in tests 400B and 400C; accordingly, test 400A has the shortest pull-in duration. Similarly, test 400B begins reducing the electrical energy 402 applied to the spill valve solenoid of the fuel injector 12 to a keep-in level later than in test 400A but earlier than in test 400C and therefore has a pull-in duration longer than test 400A but shorter than test 400C. Test 400C begins reducing the electrical energy 402 applied to the spill valve solenoid 21 of the fuel injector 12 to a keep-in level later than in both tests 400A and 400B and therefore has the longest pull-in duration of the three tests. Accordingly, the power draw of the fuel injector 12 is greatest for test 400C, least for test 400A, and somewhere in between for test 400B.

Thus, for each of tests 400A-400C performed on the fuel injector 12, a different pull-in duration is tested, and a power draw of the fuel injector 12 is determined for the pull-in duration, producing a power draw-pull-in duration data point for the fuel injector 12. In this way, through a series of tests performed on the fuel injector 12, a pull-in duration map 86 may be generated, representing an expected power draw for any give pull-in duration. The pull-in duration map 86 generated for the fuel injector 12 may be provided to an ECM 80 that will govern the operation of the fuel injector 12 for an engine system that the fuel injector 12 is included in. Then, given appropriate inputs, the ECM 80 can use the pull-in duration map 86 generated for the fuel injector 12 to determine an appropriate pull-in duration for the fuel injector 12 and generate and/or output control commands (e.g., spill valve commands 83 or control valve commands 84) based on the determined pull-in duration, as described in further detail below. After being generated through a series of tests (e.g., EOL tests), a pull-in duration map 86 may be provided to an ECM 80 before or after the fuel injector 12 and/or the ECM 80 is installed in a machine that employs the fuel injector 12. A pull-in duration map 86 may be provided to an ECM 80 in the form of one or more electronic or digital files or documents (e.g., a trim file) that can be read by the ECM 80.

In some instances, the power drawn by a fuel injector 12 given a particular pull-in duration may be at least in part determined by one or more engine conditions 85, such as engine speed. In some such instances, a pull-in duration map 86 may be generated by testing individual pull-in durations across a range of engine speeds, as depicted in FIG. 3. In some instances, a valve arrival time (VAT) may be determined during one or more EOL tests. A VAT may be the amount of time that it takes for a valve of a fuel injector 12 to reach a fully-actuated position, measured from the time at which electrical energy applied to a valve solenoid of the fuel injector 12 was first increased to move the valve to the fully-actuated position. In some instances, a pull-in duration determined for a fuel injector 12 is at least as long as the VAT determined for the fuel injector 12. A VAT may be measured directly or indirectly, such as by measuring a pressure-controlled start of injection (SOI) time. However, a VAT may be determined for a fuel injector 12 in any other appropriate way. For example, in some instances, an ECM 80 is capable of identifying, detecting, or determining a VAT of a valve of a fuel injector 12 during the operation of the fuel injector 12 within an engine system including the ECM 80 in real or near-real time.

INDUSTRIAL APPLICABILITY

Fuel injection system 10 may be used in conjunction with any appropriate machine, vehicle, or other device or system that includes an engine system (e.g., an internal combustion engine) having one or more fuel injectors 12 with electronically-controlled valves. In particular, fuel injection system 10 may be used in any internal combustion engine in which it is desirable to control the power drawn by a fuel injector 12 included in the internal combustion engine. In general, lower power draw reduces cost and increases the efficiency and safety of an engine system.

In some instances, to release a shot of fuel from a fuel injector 12, a spill valve 20 of the fuel injector 12 begins at rest in an open position, and a control valve 30 of the fuel injector 12 begins at rest in a non-injection position. Electrical energy is then applied to a spill valve solenoid 21 of the spill valve 20 to move the spill valve 20 to a closed position. While the spill valve 20 is in the closed position, the pressure within the fuel injector increases (as described above). Electrical energy is applied to a control valve solenoid 31 to move the control valve 30 to an injection position (as described above), allowing pressurized fuel within the fuel injector 12 to be released in a shot of fuel from the fuel injector 12. The electrical energy applied to both the spill valve solenoid 21 and the control valve solenoid 31 is then reduced (at the same time or at different times) to move or allow the respective valves to return to their respective rest positions. Each iteration of this cycle may be referred to as an injection event.

Figure 5:
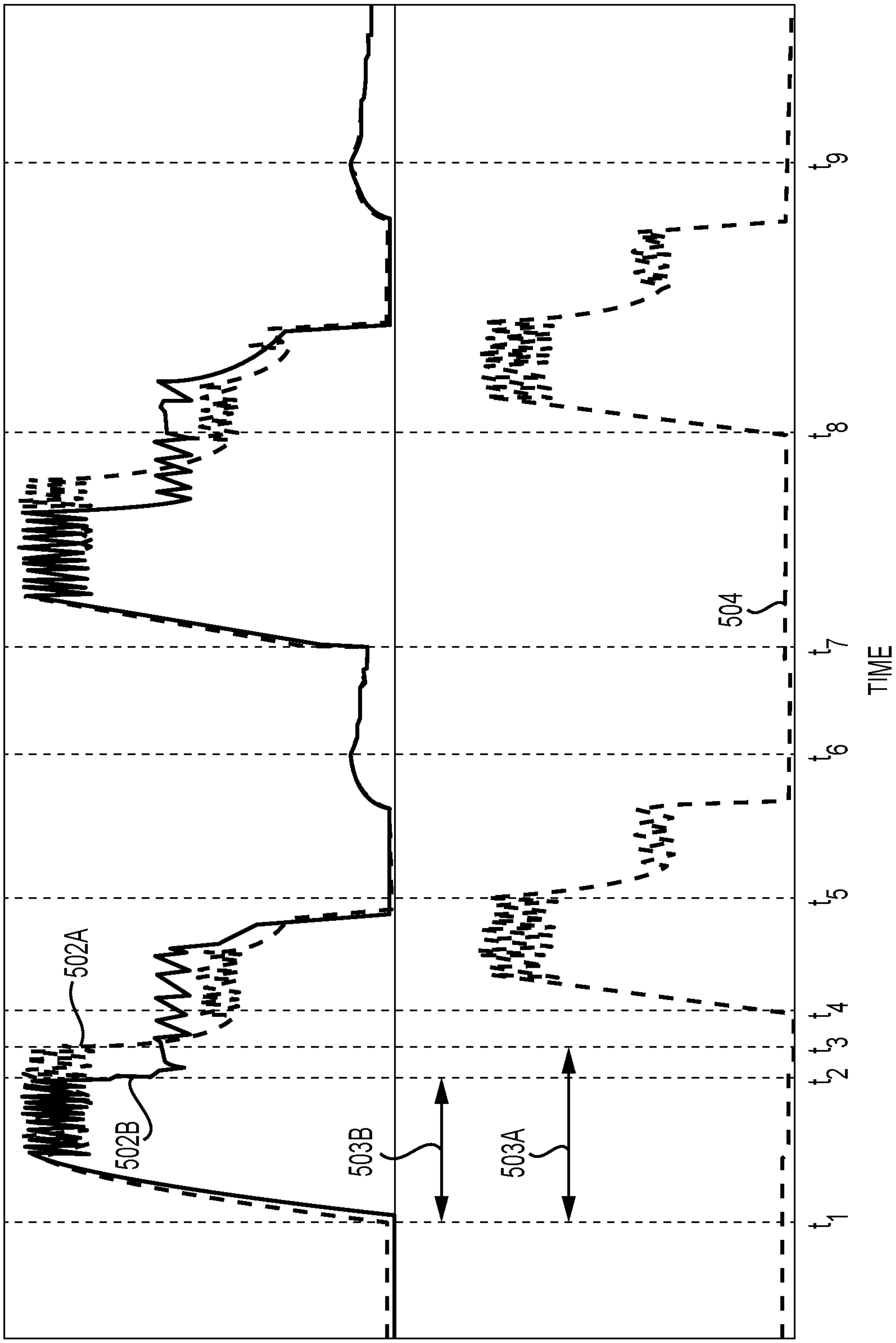
FIG. 5 depicts a chart representing an exemplary operations of the fuel injector of FIG. 1.

For both the spill valve 20 and the control valve 30, between the time at which the electrical energy applied to the solenoid of the respective valve is increased to move the valve toward its respective actuated position (which may be referred to as a pull-in time) and the time at which the electrical energy applied to the solenoid is reduced to return or allow the valve to return to its respective rest position, the electrical energy applied to the solenoid may be reduced to an intermediate, keep-in level (as described above). For both valves, the amount of time that elapses between 1) the time at which the electrical energy applied to the valve is increased to move the valve to its respective injection position (e.g., time $t_1$, as depicted in FIG. 5 and described in further detail below) and 2) the time at which the electrical energy applied to the valve is first reduced to a keep-in level (e.g., $t_2$, as depicted in FIG. 5 and described in further detail below), may be referred to as a pull-in duration (e.g., a spill pull-in duration or a control pull-in duration, respectively). For both valves, the amount of time that elapses between 1) the time at which the electrical energy applied to the valve is first reduced to a keep-in level and 2) the time at which the electrical energy applied to the valve begins to be further reduced to return or allow the valve to return to its respective rest position may be referred to as a keep-in duration (e.g., a spill keep-in duration or a control keep-in duration, respectively).

In some instances, the electrical energy provided to a valve of a fuel injector 12 during a pull-in duration or a keep-in duration is kept within a particular range defined by a maximum value and a minimum value set for the electrical energy for the pull-in duration or the keep-in duration. In such an instance, the electrical energy provided to the valve of the fuel injector 12 may be allowed to alternatingly rise until it reaches the maximum value and fall until it reaches the minimum value, such as by connecting the fuel injector 12 to one or more power sources and disconnecting the fuel injector 12 from the one or more power sources, respectively, in a process that may be referred to as chopping. Chopping may reduce the power draw of the fuel injector 12 on one or more power sources that provide electrical energy to the fuel injector 12 and/or may help prevent the coils of the solenoid or other electrical components from generating more heat than desired.

FIG. 5 depicts spill valve commands and control valve commands (both in the form of waveforms) for releasing two shots of fuel from a fuel injector 12. In the example depicted by FIG. 5, electrical energy applied to a spill valve solenoid 21 of the fuel injector 12 (upper waveforms) and electrical energy applied to a control valve solenoid 31 of the fuel injector 12 (lower waveforms) are plotted separately with respect to the same period of time.

The electrical energy applied to the spill valve solenoid 21 is shown for the operation of the fuel injector 12 using power draw control methods and systems disclosed herein (upper solid line plot) and without using power draw control methods and systems disclosed herein (upper chain-dot line plot). For example, for a first shot of fuel released from a fuel injector 12, as depicted in FIG. 5, without using power draw control methods and systems disclosed herein, the electrical energy 502A applied to a spill valve solenoid 21 of the fuel injector 12 is increased at a time $t_1$ to move the spill valve 20 of the fuel injector 12 to a closed position. The time at which electrical energy applied to a spill valve solenoid 21 of a fuel injector 12 is increased to move a spill valve 20 of the fuel injector 12 to a closed position may be referred to as a spill pull-in time. The electrical energy 502A applied to the spill valve solenoid 21 of the fuel injector 12 may be later reduced to a spill keep-in level that keeps the spill valve 20 in the closed position (as described above), for example at time $t_3$. The amount of time that elapses between a spill pull-in time (e.g., time $t_1$) and the time at which the electrical energy applied to a spill valve 20 is first reduced to a spill keep-in level (e.g., time $t_3$) may be referred to as a spill pull-in duration (e.g., spill pull-in duration 503A). While the spill valve 20 is in the closed position, pressure within the fuel injector 12 increases.

As depicted in FIG. 5, the electrical energy 504 applied to a control valve solenoid 31 of the fuel injector 12 is increased at time $t_4$, sometime after the spill pull-in time (e.g., time $t_1$), to move the control valve 30 of the fuel injector 12 to an open or injection control position, thereby allowing pressurized fuel within the fuel injector 12 to be released from the fuel injector 12 in a first shot of fuel. The time at which the electrical energy applied to a control valve solenoid 31 of a fuel injector 12 to move a control valve of the fuel injector 12 to an open or injection control position may be referred to as a control pull-in time. If desired, the electrical energy 504 applied to the control valve solenoid 31 of the fuel injector 12 may be later reduced to a control keep-in level that keeps the control valve 30 in the open or injection control position (as described above) at time $t_5$. As depicted in FIG. 5, the same or similar spill valve commands and control valve commands may be used to release a second shot of fuel from the fuel injector 12.

As depicted in FIG. 5, using the power draw control methods and systems disclosed herein, the electrical energy 502B applied to the spill valve solenoid 21 of the fuel injector 12 may be increased to move the spill valve 20 of the fuel injector 12 to the closed position at the same pull-in time that the electrical energy 502A is (e.g., time $t_1$), but the electrical energy 502B applied to the spill valve solenoid 21 of the fuel injector 12 may be reduced to a spill keep-in level at an earlier time (e.g., at time $t_2$) as compared to the time at which electrical energy 502A was reduced (e.g., at time $t_3$), resulting in a spill pull-in duration 503B that is shorter than spill pull-in duration 503A. Because the spill pull-in duration 503B is shorter than the spill pull-in duration 503A, the power drawn by the fuel injector 12 according to the waveform of electrical energy 502B will be less than the power drawn by the fuel injector 12 according to the waveform of electrical energy 502A.

To determine the length of the spill pull-in duration 503B, one or more pull-in duration maps 86 may be used. For example, the pull-in duration map 86 depicted in FIG. 3 may correspond to a spill pull-in duration map generated for the fuel injector 12 of the example of FIG. 5, generated using a series of tests performed on the fuel injector 12 (as described above). In this example, an ECM 80 included in an engine system including the fuel injector 12 may retrieve the spill pull-in duration map 86 and determine the length of a spill pull-in duration 503B for the waveform of electrical energy 502B using the spill pull-in duration map, such as by determining or receiving engine conditions 85 including an engine speed of the engine system and determining, based on the engine speed, an appropriate length of the spill pull-in duration 503B. In some instances, as depicted in FIG. 5, when the ECM 80 uses a comparatively shorter pull-in duration, the ECM 80 uses a comparatively higher level of electrical energy during a corresponding keep-in duration. This may be because it may require more electrical energy to keep the spill valve in the closed position if a shorter pull-in duration is used.

In some instances, an engine system may include multiple power sources capable of providing electrical energy to a fuel injector 12 included in the engine system. In some such instances, the engine system may use different power sources, or different combinations of power sources, to provide electrical energy to the fuel injector 12 at different times. For example, in some instances, an engine system may include a high voltage energy source (e.g., an alternator, a generator, etc.) capable of providing electrical energy to one or more solenoids of a fuel injector 12 and a low voltage energy source (e.g., a battery) capable of providing electrical energy to the fuel injector 12. In some such instances, the engine system (e.g., an ECM 80 included in the engine system) may use the high voltage energy source to provide electrical energy to the fuel injector 12 during a spill pull-in duration (e.g., spill pull-in duration 503B) and use the low voltage energy source to provide electrical energy to the fuel injector 12 during a spill keep-in duration. For example, immediately after the spill pull-in duration 503B, the engine system may switch from providing electrical energy 502B to the spill valve 20 of the fuel injector 12 using the high voltage energy source to providing electrical energy 502B to the spill valve 20 of the fuel injector 12 using the low voltage energy source (e.g., throughout the spill keep-in duration). In this way, the engine system may further reduce power drawn by the fuel injector 12 on one or more power sources.

Figure 6:
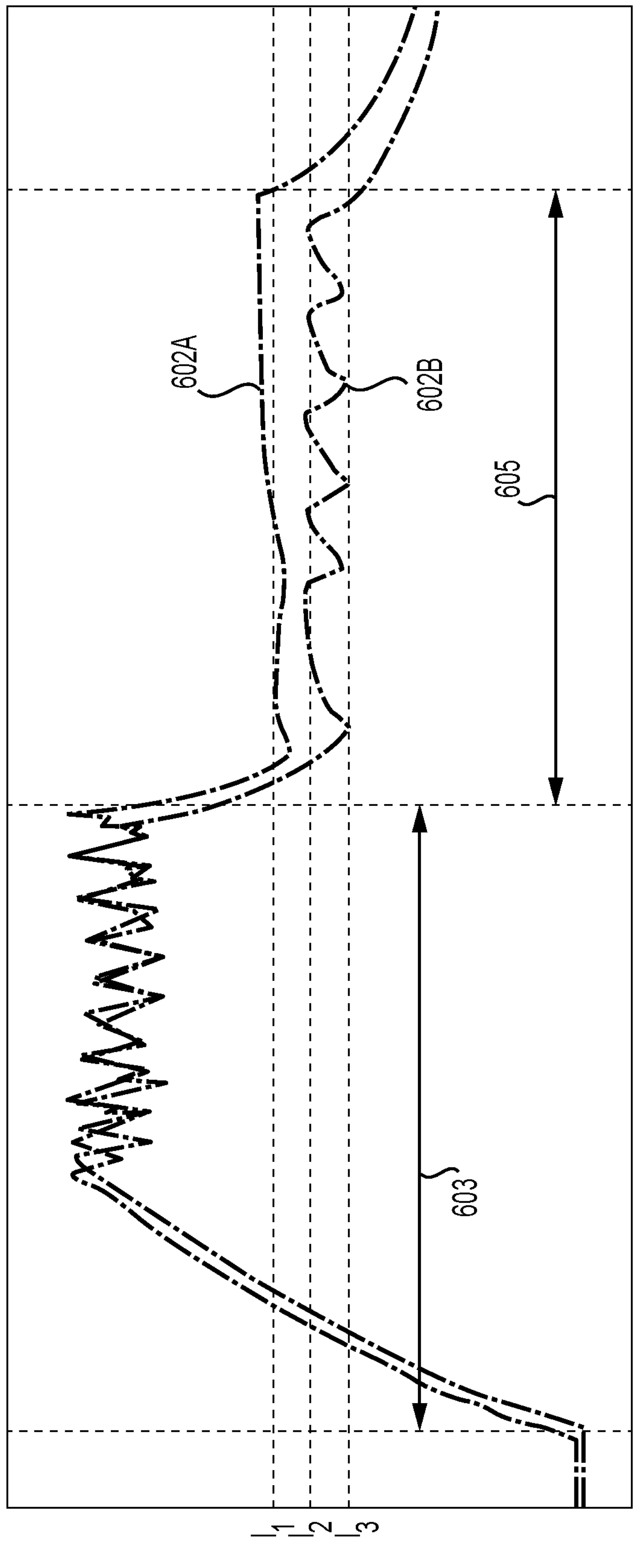
FIG. 6 depicts a chart representing exemplary operations of the fuel injector of FIG. 1.

In some instances, when an engine system includes a high voltage energy source and a low voltage energy source and uses the low voltage energy source to provide electrical energy to a spill valve 20 of a fuel injector 12 throughout a keep-in duration, the engine system (e.g., an ECM 80 included in the engine system) sets a maximum value and a minimum value for chopping the electrical energy (as described above) during the keep-in duration based on one or more characteristics of the low voltage energy source, such as a voltage and/or a capacity of the low voltage energy source. For example, FIG. 6 depicts electrical energy applied to a valve of a fuel injector 12 with chopping and without chopping. In this example, electrical energy is applied to a valve of a fuel injector 12 throughout a pull-in duration 603 and a keep-in duration 605. The electrical energy applied to the valve of the fuel injector 12 throughout the pull-in duration 603 is provided primarily by a high voltage energy source, and the electrical energy applied to the valve of the fuel injector 12 throughout the keep-in duration 605 is provided primarily by a low power energy source (e.g., a battery). In a first example, no maximum value is set by the engine system for the electrical energy 602A applied to the valve of the fuel injector 12 throughout the keep-in duration. In this example, when the engine system switches from the high voltage energy source to the low voltage energy source, the electrical energy (e.g., a current) reaches and remains substantially constant at a maximum current level ($I_1$) proportional to the voltage of the low voltage energy source. Thus, throughout the keep-in duration 603, the electrical energy 602A applied to the valve of the fuel injector 12 does not chop.

In a second example, for the electrical energy 602B applied to the valve of the fuel injector 12, the engine system sets a maximum current value ($I_2$) that is less than current value $I_1$ and a minimum current value ($I_3$) that is less than current value $I_2$. In this example, during the keep-in duration 605, when the electrical energy 602B reaches current value $I_2$, the engine system disconnects the fuel injector 12 from the low voltage energy source to reduce the electrical energy 602B, and when the electrical energy 502B falls to current value $I_3$, the engine system reconnects the fuel injector 12 to the low voltage energy source to increase the electrical energy 602B. Thus, the electrical energy 602B chops between current value $I_2$ and current value $I_3$ throughout the keep-in duration 605.

In some instances, an engine system (e.g., an ECM 80 included in the engine system) can adjust a pull-in time (e.g., a spill pull-in time) to account for various factors. For example, in some instances, varying a pull-in duration (as described above) or switching from a high power energy source to a low power energy source (as described above) can cause a valve of a fuel injector 12 to behave differently than expected, which may impact the operational efficiency of an engine system in which the fuel injector 12 is included. For example, in some instances, reducing a spill pull-in duration for a spill valve 20 of a fuel injector 12 may cause the spill valve 20 to move slower and therefore reach its fully-actuated position at a later time (e.g., a later valve arrival time (VAT), as described above and below).

The amount of time that elapses between 1) the time at which electrical energy applied to a valve (e.g., a spill valve 20) of a fuel injector 12 is first increased to move or allow the valve to move to its fully-actuated position and 2) the time at which the valve actually reaches its fully-actuated position may be referred to as a valve arrival time (e.g., a spill valve arrival time). An engine system that includes the fuel injector 12 may store or calculate an expected valve arrival time in ECM 80, and if one or more valve arrival times observed or measured during the operation of the fuel injector 12 are different than the expected valve arrival time, the engine system (e.g., an ECM 80 included in the engine system) can calculate a difference between the one or more observed valve arrival times and the expected valve arrival time and adjust a pull-in time for the fuel injector 12 according to the difference. For example, in some instances, the engine system can calculate an average of one or more spill valve arrival times of a fuel injector 12, which may be referred to as an average spill valve arrival time, and compare the average spill valve arrival time to an expected spill valve arrival time for the fuel injector 12. Then, for example, if the average spill valve arrival time is longer than the expected spill valve arrival time, the engine system can advance the spill pull-in time for future spill valve commands 83 generated for the fuel injector 12. Or for example, if the average spill valve arrival time is shorter than the expected spill valve arrival time, the engine system can delay the spill pull-in time for future spill valve commands 83 generated for the fuel injector 12. A spill pull-in time may be advanced or delayed relative to any other timing involved in the operation of a fuel injector 12, such as a time at which electrical energy applied to a spill valve 20 of the fuel injector 12 is reduced to a keep-in level, a time at which electrical energy applied to a spill valve 20 of the fuel injector 12 is reduced to return or allow the spill valve 20 to return to its resting, open position, or a control pull-in time. Therefore, the timing of one valve (e.g., spill valve 20) may be adjusted while the timing of another valve (e.g., control valve 30) may be constant between injections. These timings may be measured with respect to the crank angle of the engine. In some instances, when a spill pull-in time is adjusted for a future spill valve command 83, a pull-in duration determined for the future spill valve command 83 is unaffected by the adjustment of the spill pull-in time (e.g., a value from a pull-in duration map 86 is used without additional adjustment or correction). In other instances, when a spill pull-in time is adjusted for a future spill valve command 83, a pull-in duration determined for the future spill valve command 83 is adjusted according to the adjustment of the spill pull-in time.

FIG. 7 depicts a flowchart of a method 700 for controlling a fuel injector of an engine system, which may include fuel injection system 10. Method 700 may be performed repeatedly during the operation of an engine system to adjust commands (e.g., spill valve commands 83) generated and/or outputted by a controller (e.g., ECM 80) to compensate for changing engine conditions 85. It will be understood that although the steps of the method 700 are described herein as applied to a spill valve solenoid 21 and a spill valve 20 of a fuel injector 12 that includes both a spill valve 20 and a control valve 30, the steps of the method 700 may be similarly applied to a control valve solenoid 31 and a control valve 30 of a fuel injector 12 that includes both a spill valve 20 and a control valve 30, or to any solenoid or valve of a fuel injector 12 that includes any number of valves, including injectors having only one electronically-controlled valve.

As depicted in FIG. 7, method 700 may begin with a step 702, in which a pull-in duration for a fuel injector 12 is determined based at least in part on at least one engine condition 85 of the engine system. For example, as described above, an ECM 80 may include or otherwise have access to one or more pull-in duration maps 86 generated for the fuel injector 12. As described above, a pull-in duration map 86 may represent a relationship between pull-in duration and power draw for the fuel injector 12. As described above, a pull-in duration may be an amount of time that elapses between 1) a time at which the electrical energy applied to a spill valve solenoid 21 of the fuel injector 12 is increased to move a spill valve 20 of the fuel injector 12 to a closed position (e.g., a spill pull-in time, such as time $t_1$ in FIG. 5) and 2) a time at which the electrical energy applied to the spill valve solenoid 21 is reduced to a keep-in level. In general, a shorter pull-in duration results in a lower power draw by the fuel injector 12 for a given set of engine conditions. As described above, the power draw by a fuel injector 12 may be determined at least in part by one or more engine conditions 85 of the engine system, such as an engine speed, while pull-in duration map 86 represents a relationship of pull-in duration, power draw, and the one or more engine conditions (e.g., engine speed detected with speed sensor 87 and/or engine request 88). Thus, for example, given one or more engine conditions, the ECM 80 can retrieve a pull-in duration map 86 generated for the fuel injector 12 and determine or select a pull-in duration that minimizes the power draw of the fuel injector 12, or that maximizes the power draw of the fuel injector 12 without exceeding a power limit and while supplying a desired quantity of fuel. If desired, ECM 80 may determine or select a pull-in duration for a fuel injector 12 using a pull-in duration map 86 based on other factors.

In some instances, an ECM 80 includes or otherwise has access to a plurality of pull-in duration maps 86 generated for a plurality of fuel injectors 12 included in an engine system, and the ECM 80 can select the pull-in duration map 86 generated for the fuel injector 12 from the plurality of pull-in duration maps 86 generated for the plurality of fuel injectors 12. In some instances, the pull-in duration map 86 was generated using a series of end-of-line (EOL) tests, as described above. In some instances, the series of EOL tests determined a spill valve arrival time (VAT) for the fuel injector 12, and the pull-in duration determined for the fuel injector 12 is at least as long as the spill VAT determined for the fuel injector 12.

As depicted in FIG. 7, after determining a pull-in duration for the fuel injector 12 based on the at least one engine condition 85, the method 700 may continue with a step 704, in which, at a pull-in time (as described above), electrical energy applied to a solenoid valve 21 of the fuel injector 12 is increased to move a spill valve 20 of the fuel injector 12 to a closed position for the determined pull-in duration. For example, as described above, in some instances, fuel may not be released from a fuel injector 12 until enough electrical energy is applied to a spill valve solenoid 21 of the fuel injector 12 to move a spill valve 20 of the fuel injector to a closed position. While the spill valve 20 is in the closed position, pressure within the fuel injector 12 increases, such that pressurized fuel may be released in a shot of fuel from the fuel injector 12 when a control valve 30 of the fuel injector 12 is moved to an injection position. In some instances, the pull-in duration begins immediately after the pull-in time. As described above, electrical energy may be applied to the spill valve solenoid 21 of a fuel injector 12 from a power source (e.g., a high voltage energy source or a low voltage energy source). An ECM 80 may apply electrical energy to a spill valve solenoid 21 of a fuel injector 12 (or cause a power source to apply electrical energy to the spill valve solenoid 21) by generating and/or outputting an appropriate spill valve command 83, as described above.

As depicted in FIG. 7, after the electrical energy applied to the spill valve solenoid 21 of the fuel injector 12 is increased to move the spill valve 20 of the fuel injector 12 to the closed position for the determined pull-in duration, the method 700 may continue with a step 706, in which, after the determined pull-in duration, the electrical energy applied to the spill valve solenoid 21 of the fuel injector 12 is reduced to a keep-in level (as described above). In some instances, the electrical energy applied to the spill valve solenoid 21 of the fuel injector 12 is reduced to the keep-in level immediately after the pull-in duration. In some instances, the engine system includes a high voltage energy source that at least partially provides the electrical energy applied to the spill valve solenoid 21 of the fuel injector 12 throughout the pull-in duration and a low voltage energy source that at least partially provides the electrical energy applied to the spill valve solenoid 21 of the fuel injector 12 after the electrical energy is reduced to the keep-in level (as described above). An ECM 80 may reduce the electrical energy applied to a spill valve solenoid 21 of a fuel injector 12 (or cause a power source to reduce the electrical energy applied to the spill valve solenoid 21) by generating and/outputting an appropriate spill valve command 83, as described above.

As depicted in FIG. 7, in some instances, the method 700 includes an optional step 708, in which a difference between one or more spill valve arrival times (e.g., one or more observed or measured spill valve arrival times) and an expected spill valve arrival time is calculated. As described above, a spill valve arrival time may be an amount of time that elapses between 1) a time at which the electrical energy applied to a spill valve solenoid 21 of a fuel injector 12 is first increased to move or to allow a spill valve 20 to move to a fully-actuated position and 2) a time at which the spill valve 20 of the fuel injector 12 actually reaches the fully-actuated position. In some instances, an ECM 80 of an engine system includes or otherwise has access to an expected spill valve arrival time (which may be determined using one or more tests, as described above) determined for a fuel injector 12, and can detect or otherwise measure a spill valve arrival time of a spill valve 20 of the fuel injector 12 throughout each of a plurality of injection events. The ECM 80 can then calculate an average of the spill valve arrival times and compare the resulting average spill valve arrival time to the expected spill valve arrival time.

As depicted in FIG. 7, in some instances, after a difference between one or more spill valve arrival times and an expected spill valve arrival time is calculated for the fuel injector 12, the method 700 continues with a step 710, in which a pull-in time for the fuel injector 12 is adjusted based on the difference between the one or more spill valve arrival times and the expected spill valve arrival time. For example, as described above, if an average spill valve arrival time calculated for a fuel injector 12 is longer than the expected spill valve arrival time for the fuel injector 12, an ECM 80 can delay the pull-in time for future injection events of the fuel injector 12 accordingly. Or for example, if the average spill valve arrival time calculated for the fuel injector 12 is shorter than the expected spill valve arrival time for the fuel injector 12, the ECM 80 can advance the spill pull-in time for future injection events of the fuel injector 12 accordingly. An ECM 80 may delay or advance the spill pull-in time for a fuel injector 12 by generating and/or outputting an appropriate spill valve command 83, as described above.

Although the methods and systems disclosed herein are described in relation to a fuel injector 12 that includes a plurality of valves (e.g., a spill valve 20, a control valve 30, and a check valve), it will be understood that the methods and systems disclosed herein may also be applied to any type of valve included in a fuel injector and/or to a fuel injector that includes any number of valves. For example, a fuel injector may include only a single valve that performs the function or a similar function of a control valve as described herein, and a pull-in duration map 86 may generated and used for the single valve included in the fuel injector. Or for example, a fuel injector may include only a single valve that performs both functions or similar functions of a spill valve and a control valve as described herein, and a pull-in duration map 86 may be generated and used for the single valve included in the fuel injector. Or for example, a fuel injector may include three or more valves, and three or more respective pull-in duration maps 86 may be generated and used for the three or more valves.

Adjusting a pull-in duration for a fuel injector 12 may allow an ECM 80 to control or reduce the power drawn by the fuel injector 12. Controlling or reducing the power drawn by a fuel injector 12 may allow an engine system that includes the fuel injector 12 to operate more efficiency and with less risk of wear or damage. Controlling or reducing the power drawn by a fuel injector 12 may also allow an engine system that includes the fuel injector 12 to operate more efficiently, such as by reducing the number of controllers or power sources required to operate the engine. By generating and using pull-in duration maps 86 for a plurality of fuel injectors 12 included in an engine system, the engine system can improve its efficiency by controlling or reducing the power drawn by the fuel injectors 12 included in the engine system on an injector-by-injector basis.

It will be apparent to those skilled in the art that various modifications and variations can be made to the disclosed method and system without departing from the scope of the disclosure. Other embodiments of the method and system will be apparent to those skilled in the art from consideration of the specification and practice of the apparatus and system disclosed herein. It is intended that the specification and examples be considered as exemplary only, with a true scope of the disclosure being indicated by the following claims and their equivalents.

What is claimed is:

1. A method for controlling a fuel injector of an engine system, the method comprising:

determining, based on an engine condition of the engine system, a pull-in duration for the fuel injector during which current is applied to move a valve member away from a resting position;

applying a current to a valve solenoid to move the valve member of the fuel injector to a closed position for the determined pull-in duration; and after the determined pull-in duration, reducing the current applied to the valve solenoid to a keep-in level.

2. The method of claim 1, wherein the pull-in duration begins immediately after a pull-in time at which the current is first applied to the valve solenoid to move the valve member to the closed position, and the current applied to the valve solenoid is reduced to the keep-in level immediately after the pull-in duration.

3. The method of claim 1, wherein determining the pull-in duration for the fuel injector comprises referencing the engine condition with at least one pull-in duration map generated for the fuel injector.

4. The method of claim 3, wherein the engine condition includes an engine speed of the engine system.

5. The method of claim 3, wherein the engine system includes a plurality of fuel injectors including the fuel injector and the method further comprises selecting the at least one pull-in duration map from a plurality of pull-in duration maps generated for the plurality of fuel injectors.

6. The method of claim 3, wherein the at least one pull-in duration map was generated using a series of tests performed on the fuel injector.

7. The method of claim 6, wherein the series of tests determined a valve arrival time for the fuel injector and wherein the pull-in duration is at least as long as the valve arrival time.

8. The method of claim 1, wherein the engine system further includes a high voltage energy source for providing electrical energy to the valve solenoid and a low voltage energy source for providing electrical energy to the valve solenoid, wherein the current applied to the valve solenoid is at least partially provided by the high voltage energy source during the pull-in duration, and wherein the current applied to the valve solenoid is at least partially provided by the low voltage energy source after the current is reduced to the keep-in level.

9. The method of claim 8, wherein the current applied to the valve solenoid is at least partially provided by the low voltage energy source after the current is reduced to the keep-in level for a keep-in duration.

10. The method of claim 9, further comprising setting a keep-in current maximum and a keep-in current minimum for the keep-in duration based on a voltage or a capacity of the low voltage energy source.

11. The method of claim 1, wherein the valve is a spill valve and wherein the fuel injector further comprises a control valve.

12. A method for controlling a fuel injector of an engine system, the method comprising:

for an injection event:

applying current to a valve solenoid to move a valve of the fuel injector to an actuated position for a pull-in duration based on a pull-in duration map generated for the fuel injector; and measuring a valve arrival time associated with the valve of the fuel injector; and in a subsequent injection event:

applying current to the valve solenoid to move the valve of the fuel injector for a second pull-in duration based on the pull-in map generated for the fuel injector, a start of the current for the second pull-in duration being adjusted based on the measured valve arrival time; and after the second pull-in duration, reducing the current applied to the valve solenoid to a keep-in level.

13. The method of claim 12, wherein adjusting the time at which the current applied to the valve solenoid is increased to move the valve of the fuel injector to the actuated position based on the average valve arrival time comprises:

calculating a difference between an average valve arrival time and an expected valve arrival time; and adjusting the start of current for the pull-in time according to the difference between the average valve arrival time and the expected valve arrival time.

14. The method of claim 13, wherein adjusting the pull-in time includes advancing the pull-in time if the average valve arrival time is greater than the expected valve arrival time and delaying the pull-in time if the average valve arrival time is less than the expected valve arrival time.

15. The method of claim 13, wherein the expected valve arrival time was determined by a series of tests performed on the fuel injector.

16. An engine system including at least one fuel injector and a controller operative to:

determine, based on an engine condition of the engine system, a pull-in duration for the fuel injector;

apply a current to a valve solenoid to move a valve of the fuel injector to an actuated position for the determined pull-in duration; and after the determined pull-in duration, reduce the current applied to the valve solenoid to a keep-in level.

17. The engine system of claim 16, wherein the pull-in duration begins immediately after a pull-in time at which the current is first applied to the valve solenoid to move the valve member to the actuated position, and the current applied to the valve solenoid is reduced to the keep-in level immediately after the pull-in duration.

18. The engine system of claim 16, wherein the pull-in time is based on one or more valve arrival times of one or more prior injection events.

19. The engine system of claim 16, wherein the controller is further operative to determine the pull-in duration for the fuel injector comprises referencing the engine condition with at least one pull-in duration map generated for the fuel injector.

20. The engine system of claim 16, wherein the engine condition includes an engine speed of the engine system.

* * * * *